United States Patent
Lee

(10) Patent No.: US 8,640,607 B2
(45) Date of Patent: Feb. 4, 2014

(54) BIDIRECTIONAL HEATING COOKER

(76) Inventor: Jin Hee Lee, Goyang-si (KR)

(*) Notice: Subject to any disclaimer, the term of this patent is extended or adjusted under 35 U.S.C. 154(b) by 17 days.

(21) Appl. No.: 13/321,408

(22) PCT Filed: Apr. 12, 2010

(86) PCT No.: PCT/KR2010/002234
§ 371 (c)(1),
(2), (4) Date: Jan. 24, 2012

(87) PCT Pub. No.: WO2010/134695
PCT Pub. Date: Nov. 25, 2010

(65) Prior Publication Data
US 2012/0132083 A1    May 31, 2012

(30) Foreign Application Priority Data
May 19, 2009   (KR) ................. 10-2009-0043420

(51) Int. Cl.
*G07F 9/10* (2006.01)
(52) U.S. Cl.
USPC .................................. 99/357; 99/416; 99/419
(58) Field of Classification Search
USPC ....................... 99/357, 416, 419, 421 HV, 448
See application file for complete search history.

(56) References Cited

U.S. PATENT DOCUMENTS

| | | | | |
|---|---|---|---|---|
| 2,386,426 A * | 10/1945 | Brannon | .......... | 219/521 |
| 3,777,654 A * | 12/1973 | Strathaus | .......... | 99/419 |
| 4,062,275 A * | 12/1977 | Appel et al. | .......... | 99/393 |
| 5,431,091 A * | 7/1995 | Couture | .......... | 99/401 |
| 5,473,979 A * | 12/1995 | Ruben | .......... | 99/446 |
| 5,826,497 A * | 10/1998 | Basso | .......... | 99/446 |
| 6,776,084 B2 * | 8/2004 | Wild | .......... | 99/339 |
| 7,140,362 B1 * | 11/2006 | Johnston | .......... | 126/25 A |
| 2010/0229733 A1 * | 9/2010 | Castillo | .......... | 99/448 |
| 2011/0038990 A1 * | 2/2011 | Hyun | .......... | 426/235 |

FOREIGN PATENT DOCUMENTS

| | | |
|---|---|---|
| JP | 2007-029180 A | 2/2007 |
| KR | 20-0314608 A | 5/2003 |
| KR | 10-2005-0097862 A | 10/2005 |
| KR | 10-0779225 A | 11/2007 |
| KR | 10-0833966 B1 | 5/2008 |
| KR | 10-2009-0017682 A | 2/2009 |

* cited by examiner

*Primary Examiner* — Henry Yuen
*Assistant Examiner* — John Wasaff
(74) *Attorney, Agent, or Firm* — Kile Park Reed & Houtteman PLLC

(57) ABSTRACT

Provided is an improved bidirectional heating cooker having a cooking pan including a first pan portion whose one portion is cut out open in order to form an incision portion and a second pan portion that is placed at the incision portion of the first pan portion, in a manner that the cooking pan is not formed into a fitting method being fitted with a central supporting pillar through a center hole formed at the center of the cooking pan but formed into a seating method being seated on the upper portion of a lower heating unit, to thereby enable the cooking pan to be easily attached on or detached from the lower heating unit to thus be easily washed, and to thereby allow various types of cooking pans to be easily combined to thus enhance conveniences of use and to be easily replaced with new ones and to be easily combined with other types of cooking pans to thus enable the various types of cooking pans to be used in combination and to accordingly cook different kinds of foods simultaneously.

4 Claims, 4 Drawing Sheets

BIDIRECTIONAL HEATING COOKER

TECHNICAL FIELD

The present invention relates to an improved bidirectional heating cooker, and more particularly, to an improved bidirectional heating cooker having an upper radiation unit that includes a heating unit that is located at a distance from the upper portion of a cooking pan, and grills the upper portions of foods that are put on the cooking pan by radiation heat emitted from the heating unit, and a lower heating unit that is located at the bottom of the cooking pan and directly heats the cooking pan by conduction heat transmitted from the lower heating unit, to thereby heat, cook, grill or roast the foods put on the cooking pan by both the radiation heat emitted from the upper radiation unit and the conduction heat transmitted from the lower heating unit, in which the cooking pan can be easily put on the lower heating unit without separating the upper radiation unit from the lower heating unit in the case that the cooking pan will be put on the upper portion of the lower heating unit, to thereby enhance conveniences of use, and in which the cooking pan that is put on the lower heating unit is divided into two, three or other multiple divisions according to cooking usage, cooking purposes, or conveniences of use of a cook, to then allow the cook to put the cooking pan on the lower heating unit without separating the upper radiation unit from the lower heating unit, and to thereby enable the cook to cook a variety of foods simultaneously.

BACKGROUND ART

In general, there are conduction, convection and radiation as a heat transfer mechanism. Conduction heat is mainly transferred by solid and convection heat is mainly transferred by fluid. In addition, radiation heat is transferred through a process of discharging energy formed of electromagnetic waves emitted from surface of a certain heating unit, in which heat is emitted at velocity of light even at a state of having no medium and is delivered directly to an object. Wavelength of the radiation heat ranges from an infrared ray region to an ultraviolet ray region whose wavelength is the shortest via a visible ray region. However, in comparison with the visible or ultraviolet ray, it has been known that a band of the wavelengths of the infrared rays such as far infrared rays, middle infrared rays, and near infrared rays has the strongest heating function.

Therefore, conventional cooking appliances using infrared rays have been developed in various forms.

One example of an existing infrared ray cooking appliance was disclosed in Korean Patent Registration No. 10-779225 published on Nov. 28, 2007. The infrared ray meat grill cooker disclosed in the Korean Patent Registration No. 10-779225 includes: an infrared lamp whose outer portion is composed of a quartz tube; a cooking pan that is placed over the infrared lamp; and a reflective board that is placed below the infrared lamp. The infrared ray meat grill cooker employs a uni-direction heating method in which the infrared lamp heats the cooking pan and the cooking pan grills only a lower portion of meat. As a result, the infrared ray meat grill cooker may cause inconveniences that meat must be turned over constantly in order to prevent the meat from being burnt excessively. In addition, a thermal efficiency may fall.

Another example of a cooking appliance developed using infrared ray technology was Korean Utility-model Registration No. 20-314608 published on May 27, 2003. The meat roaster disclosed in the Korean Utility-model Registration No. 314608 has a near-infrared ray lamp that is positioned at a certain distance over a gridiron grilling pan and a reflective board over the infrared ray lamp. The meat roaster applies near-infrared rays directly onto meat from the above infrared ray lamp and successfully keeps meats from burning. Accordingly, the meat roaster has an advantage that even the inner portion of the meat can be roasted evenly. However, the meat roaster also employs a uni-direction heating method in which the near-infrared rays emitted from the near-infrared ray lamp roasts only an upper portion of meat, to thereby cause inconveniences that meat must be turned over constantly in order to prevent the meat from being burnt excessively.

Moreover, in the case of these cooking pans using the infrared rays or near-infrared rays, there is a problem of delaying time taken to roast foods put on the cooking pans. In addition, since the infrared ray lamps or near-infrared ray lamps should be turned on for a long time in order to heat foods put on the cooking pans, there is also a problem that an expense burden is additionally caused by an increase of electric charges.

Meanwhile, still another example of an existing infrared ray cooking appliance was disclosed in Korean Patent Application No. 10-2009-0006812 filed by the same applicant as that of this application. The bidirectional heating cooker disclosed in the Korean Patent Application No. 10-2009-0006812 includes: a base frame that forms a lower framework; a supporting pillar that is vertically placed at the center of the upper surface of the base frame; a cooking pan that is separably placed on an upper portion of the base frame, and at the center of which a center hole through which the supporting pillar passes is formed; a cover that is provided at the upper end of the supporting pillar; an upper heating unit that is placed on the lower portion of the cover and emits radiant heat toward the cooking pan; and a lower heating unit that is provided at the lower end of the cooking pan and transfers heat directly to the cooking pan, in which the cooking pan is heated by radiant heat irradiated from the upper heating unit and is directly heated by the lower heating unit, and both lower and upper portions of food are simultaneously roasted by radiant heat irradiated from the upper heating unit and by direct heating of the lower heating unit.

Thus, the bidirectional heating cooker disclosed in the Korean Patent Application No. 10-2009-0006812 can roasts the upper and inner portions of food by the upper radiation unit and the lower heating unit, and has advantages that a thermal efficiency is excellent, foods such as meat for roasting can be evenly roasted without excessive burning although they are not continuously turned over, and thus little amount of smoke or odor is produced during cooking, in comparison with the conventional uni-directional infrared ray cooker.

However, the bidirectional heating cooker disclosed in the Korean Patent Application No. 10-2009-0006812 has a disadvantage that the cooking pan can be put on the lower heating unit only in the case the upper radiation unit is separated from the supporting pillar that is connected with the lower heating unit. That is, the cooking pan that has been put on the upper portion of the lower heating unit can be separated from the lower heating unit or the cooking pan can be replaced by another cooking pan, in order to make the cooking pan washed or replaced, only when the upper radiation unit is separated from the supporting pillar, thereby lowering conveniences of use.

In other words, since a coupling structure of the cooking pan is formed into a structure of inserting and fitting the upper portion of the supporting pillar through the center hole formed at the inner-center of the cooking pan, in the case of the bidirectional heating cooker disclosed in the Korean Patent Application No. 10-2009-0006812, the upper radiation unit should be necessarily separated from the supporting pillar when the cooking pan is separated from or coupled with the lower heating unit, to accordingly cause lowering of conveniences of use.

Further, although the bidirectional heating cooker disclosed in the Korean Patent Application No. 10-2009-0006812 has a structure of putting the cooking pan on the lower heating unit, it has a drawback that various types of cooking pans cannot be used in order to simultaneously cook different kinds of foods such as a roast food, a pot stew food, or a casserole food, due to reasons that each type of a cooking pan cannot be easily replaced with another one, and that the various types of cooking pans cannot be used in combination.

DISCLOSURE OF THE INVENTION

To solve the above problems of the conventional bidirectional heating cooker disclosed in Korean Patent Application No. 10-2009-0006812, it is an object of the present invention to provide an improved bidirectional heating cooker having a cooking pan including a first pan portion whose one portion is cut out open in order to form an incision portion and a second pan portion that is placed at the incision portion of the first pan portion, in a manner that the cooking pan is not formed into a fitting method being fitted with a central supporting pillar through a center hole formed at the center of the cooking pan but formed into a seating method being seated on the upper portion of a lower heating unit, to thereby enable the cooking pan to be easily attached on or detached from the lower heating unit to thus be easily washed, and to thereby allow various types of cooking pans to be easily combined to thus enhance conveniences of use and to be easily replaced with new ones and to be easily combined with other types of cooking pans to thus enable the various types of cooking pans to be used in combination simultaneously and to accordingly cook different kinds of foods simultaneously.

To accomplish the above object of the present invention, there is provided an improved bidirectional heating cooker comprising:

an upper radiation unit that is located at the upper portion of the heating cooker and that comprises a heat radiator that emits radiation heat therein;

a lower heating unit that is located at the lower portion of the heating cooker and that comprises a heater therein;

a supporting pillar that connects the upper radiation unit with the lower heating unit;

a coupling projection portion that is formed on the outer circumferential surface of the upper portion of the lower heating unit;

a first pan portion having a first union groove that is fitted with the coupling projection portion of the lower heating unit and that is formed along the lower circumferential portion of the first pan portion, an incision portion that is formed in a cutout open form at one side of the first pan portion, and a first supporting projection portion that is connected with the incision portion and contacts an outer surface of the supporting pillar and is formed at the center of the inner portion of the first pan portion; and a second pan portion that is fitted in the incision portion of the first pan portion and having a second union groove that is formed at a portion of the second pan portion that is fitted with the coupling projection portion of the lower heating unit and that is formed at the lower portion of the second pan portion and a second supporting projection portion that is formed at a portion of the second pan portion that contacts an outer surface of the supporting pillar.

BRIEF DESCRIPTION OF THE DRAWINGS

The above and other objects and advantages of the present invention will become more apparent by describing the preferred embodiments thereof in detail with reference to the accompanying drawings in which.

BEST MODE FOR CARRYING OUT THE INVENTION

Hereinbelow, a structure and function of an improved bidirectional heating cooker according to a preferred embodiment of the present invention will be described in more detail with reference to the accompanying drawings. In describing the structure and function of the improved bidirectional heating cooker according to the preferred embodiment of the present invention, terminology or wordings that are used in the specification and claims of the present application should be understood by meanings and concepts that match technical spirits of the present invention based on a principle that an inventor or inventors can define the meanings and concepts of the terminology or wordings appropriately in order to explain the present invention in the most preferable manner.

Figure 1:
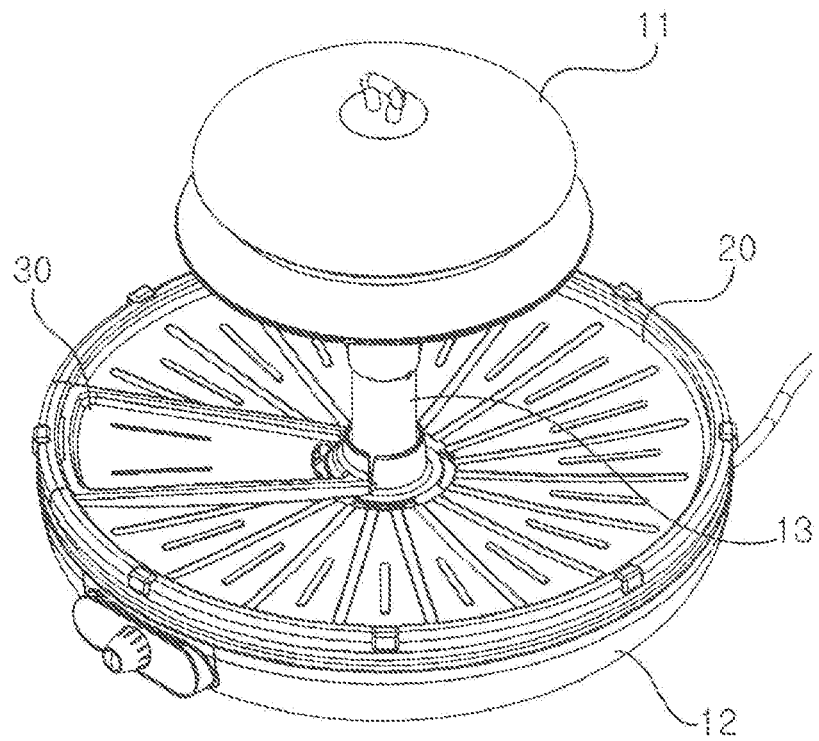
FIG. 1 is a perspective view of an improved bidirectional heating cooker according to an embodiment of the present invention.
Figure 2:
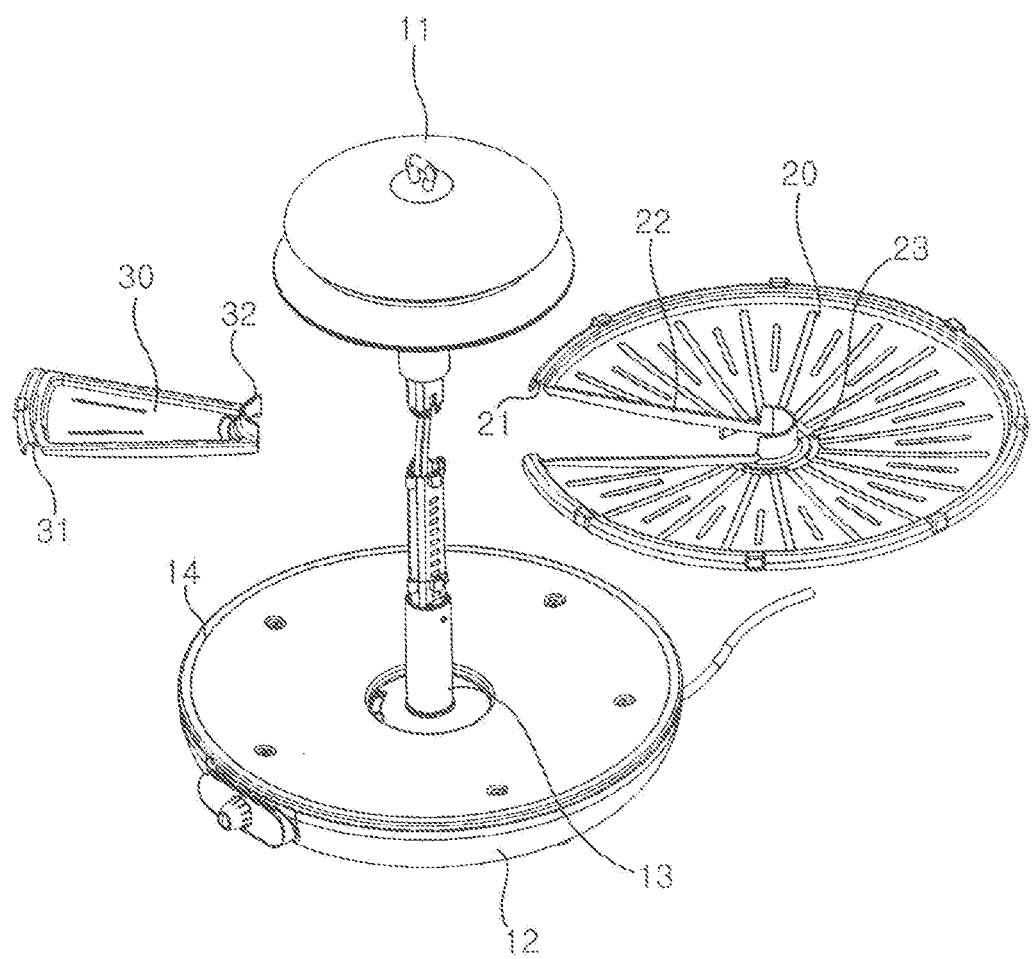
FIG. 2 is an exploded perspective view illustrating a coupling relationship among essential parts of the improved bidirectional heating cooker according to the embodiment of the present invention.
Figure 3:
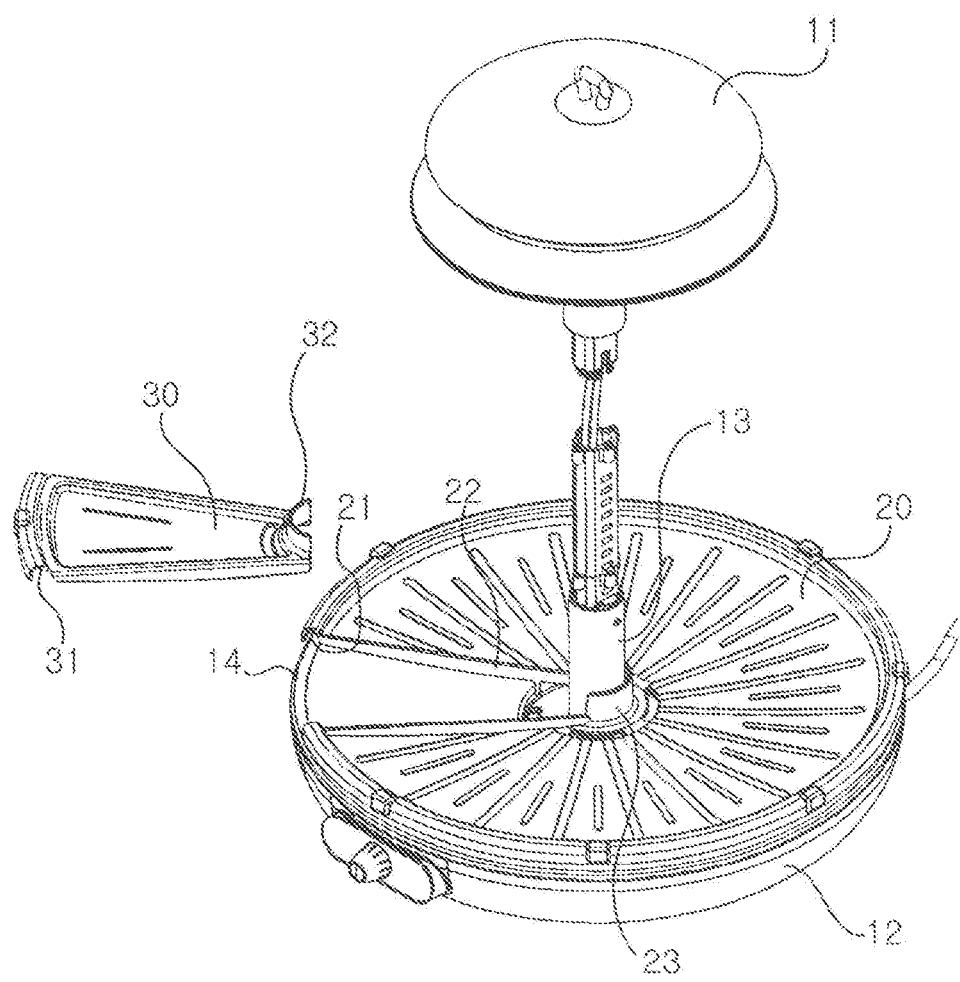
FIG. 3 is an exploded perspective view illustrating a coupling relationship of first second pan portions of a cooking pan among essential parts of the improved bidirectional heating cooker according to the embodiment of the present invention.
Figure 4:
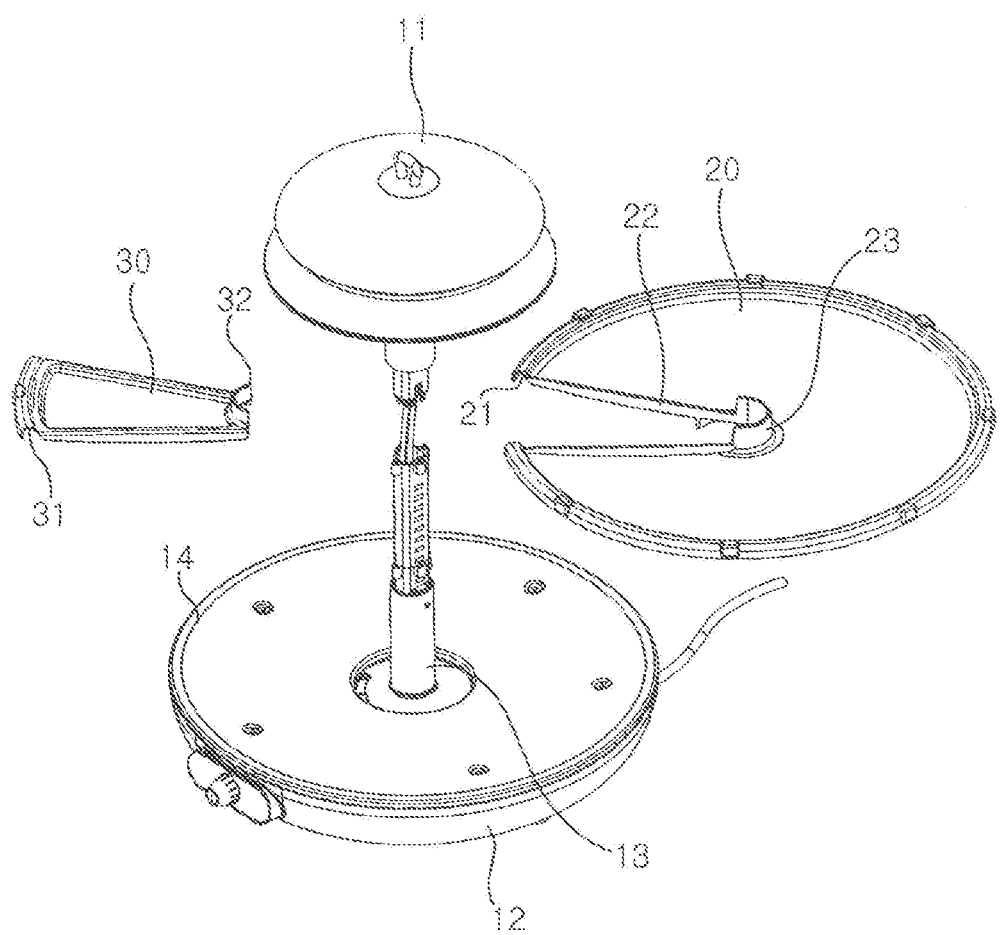
FIG. 4 is an exploded perspective view illustrating a coupling relationship of another cooking pan of the improved bidirectional heating cooker according to the embodiment of the present invention.

FIG. 1 is a perspective view of an improved bidirectional heating cooker according to an embodiment of the present invention. FIG. 2 is an exploded perspective view illustrating a coupling relationship among essential parts of the improved bidirectional heating cooker according to the embodiment of the present invention. FIG. 3 is an exploded perspective view illustrating a coupling relationship of first second pan portions of a cooking pan among essential parts of the improved bidirectional heating cooker according to the embodiment of the present invention. FIG. 4 is an exploded perspective view illustrating a coupling relationship of another cooking pan of the improved bidirectional heating cooker according to the embodiment of the present invention.

Referring to FIGS. 1 through 4, an improved bidirectional heating cooker according to an embodiment of the present invention includes: an upper radiation unit 11 that is located at the upper portion of the heating cooker and that comprises a heat radiator that emits radiation heat therein; a lower heating unit 12 that is located at the lower portion of the heating cooker and that comprises a heater therein; a supporting pillar 13 that connects the upper radiation unit 11 with the lower heating unit 12; a coupling projection portion 14 that is formed on the outer circumferential surface of the upper portion of the lower heating unit 12; a first pan portion 20 having a first union groove 21 that is fitted with the coupling projection portion 14 of the lower heating unit 12 and that is formed along the lower circumferential portion of the first pan portion 20, an incision portion 22 that is formed in a cutout open form at one side of the first pan portion 20, and a first supporting projection portion 23 that is connected with the incision portion 22 and contacts an outer surface of the supporting pillar 13 and is formed at the center of the inner portion of the first pan portion 20; and a second pan portion 30 that is fitted in the incision portion 22 of the first pan portion 20 and having a second union groove 31 that is formed at a portion of the second pan portion 30 that is fitted with the coupling projection portion 14 of the lower heating unit 12 and that is formed at the lower portion of the second pan portion 30 and a second supporting projection portion 32 that is formed at a portion of the second pan portion 30 that contacts an outer surface of the supporting pillar 13.

The first pan portion 20 and the second pan portion 30 that are the essential parts of the improved bidirectional heating cooker according to the embodiment of the present invention may be used as a roasting cooking pan for roasting food stuff such as beef, pork or fish, or as a boiling cooking pan for boiling a pot stew or meat casserole. In the case that the cooking pan is used for roasting food stuff, oil discharge holes are penetratively formed on the first pan portion 20 and the second pan portion 30 as shown in FIGS. 1 through 3. Otherwise, in the case that the cooking pan is used for boiling a pot stew or meat casserole, no oil discharge holes are penetratively formed on the first pan portion 20 and the second pan portion 30 as shown in FIG. 4.

In addition, the first pan portion 20 and the second pan portion 30 can be alternatively or selectively employed in combination of the first pan portion 20 on which oil discharge holes are penetratively formed and the second pan portion 30 on which oil discharge holes are not penetratively formed, and vice versa. In other words, for example, the first pan portion 20 having the oil discharge holes is used for roasting meat, and the second pan portion 30 having no oil discharge holes is used for boiling a Korean traditional food such as Bulgogi that is a kind of barbecue with a soup.

Therefore, a user can selectively take types of the first pan portion 20 and the second pan portion 30 differently from each other according to kinds of food stuff, and put the selected first and second pan portions 20 and 30 on the upper portion of the lower heating unit 12. Here, the first pan portion 20 and the second pan portion 30 forming the cooking pan are formed in a manner that they are not formed into a fitting structure being fitted with a central supporting pillar 13 through a center hole formed at the center of the cooking pan but formed into a seating structure being seated on the upper portion of a lower heating unit 12, to thereby enable the first pan portion 20 and the second pan portion 30 to be easily attached on or detached from the upper portion of the lower heating unit 12, and to thus enhance usability and conveniences of use greatly.

That is, since one side of the first pan portion 20 is cut out open to form the incision portion 22, the first pan portion 20 is fitted into the lateral side of the supporting pillar 13 through the incision portion 22 when the first pan portion 20 is put on the upper surface of the lower heating unit 12. Then, the first supporting projection portion 23 of the first pan portion 20 is made to closely contact the lateral surface of the supporting pillar 13, and the first union groove 21 that is formed along the lower circumference of the first pan portion 20 is fitted with the coupling projection portion 14 of the lower heating unit 12, to thus fix the first pan portion 20 on the lower heating unit 12.

In addition, the second pan portion 30 is put on the remaining upper surface of the lower heating unit 12 where the first pan portion 20 is not put on the lower heating unit 12 in a manner that the second pan portion 30 is inserted into the incision portion 22 of the first pan portion 20. In this manner, the first pan portion 20 and the second pan portion 30 can be easily put on the upper surface of the lower heating unit 12 and used as a cooking pan.

According to the above-described structure and usage, the cooking pan can be formed into a first pan portion and a second pan portion that are selected from various types of the first pan portions and the second pan portions for use of roast, pot stew, and casserole of food stuff. The selected first and second pan portions 20 and 30 can be easily put on the upper surface of the lower heating unit 12 and taken out therefrom, to thus greatly enhance conveniences of use and usability. Further, various types of cooking pans can be applied to a single heating cooker with ease of replacement according to various kinds of usage, to thereby attain a variety of cooking.

The first pan portion 20 and the second pan portion 30 that have been put on the upper portion of the lower heating unit 12 are heated by radiation heat emitted from the upper radiation unit 11 and by direct heat of the lower heating unit 12, and thus the upper and lower portions of food stuff that is put on the first pan portion 20 and the second pan portion 30 are simultaneously grilled by radiation heat of the upper radiation unit 11 and by direct heat of the lower heating unit 12.

Meanwhile, height of the supporting pillar 13 can be adjusted or fixed. That is, according to usage and places of use, the height adjustable supporting pillar and the height unadjustable supporting pillar can be applied to the heating cooker. In the case of the supporting pillar 13 whose height can be adjusted, the supporting pillar 13 may be configured to have an outer supporting pillar whose diameter is large and an inner supporting pillar whose diameter is small in order to adjust height of the supporting pillar 13. The inner supporting pillar is inserted into the outer supporting pillar so as to escalate therein. Then, a fixing screw is provided on the outer supporting pillar to thus adjust height of the supporting pillar. Otherwise, a separate supporting unit is provided in the inside of the outer supporting pillar, to thus freely adjust height of the supporting pillar. That is, in order to make an upper heat emission function more strongly, the supporting pillar is made to escalate down during cooking. During eating, the supporting pillar is made to escalate up to make people eat food comfortably. Further, according to usage, height of the supporting pillar 20 can be fixed.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

EFFECTS OF THE INVENTION

An improved bidirectional heating cooker according to this invention includes a cooking pan having a first pan portion and a second pan portion that are respectively put on the upper portion of a lower heating unit. Here, one side of the first pan portion is cut out open to form an incision portion and the second pan portion is inserted into the incision portion of the first pan portion. That is, since the first pan portion is put on the lower heating unit and then the second pan portion is fitted into the incision portion of the first pan portion on the lower heating unit, the cooking pan can be easily put on or separated from the lower heating unit without separation of the upper radiation unit from the supporting pillar.

In addition, since the cooking pan is configured into the first pan portion and the second pan portion to then be seated on the lower heating unit, without separation of the upper radiation unit from the supporting pillar, the first pan portion and the second pan portion can be easily removed and washed.

In addition, the first pan portion and the second pan portion that can be formed in various types for use of roast, pot stew or casserole of food stuff, can be easily put on and separated from the upper portion of the lower heating unit, without separation of the upper radiation unit from the supporting pillar, to thereby greatly enhance conveniences of use.

In addition, different kinds of food stuff can be put on the first pan portion and the second pan portion, for example, meat can be roasted on the first pan portion and pot stew can be boiled on the second pan portion, to thereby cook two or more kinds of foods simultaneously in a single heating cooker according to the present invention.

In addition, the improved bidirectional heating cooker according to the present invention employs a bidirectional heating technology that upper and inner portions of food that is put on a cooking pan is roasted by radiant heat emitted in an upper radiation unit, in particular, infrared radiant heat, and simultaneously the cooking pan is directly heated by a lower heating unit that is provided in the lower end of the cooking pan quickly, to thus make the lower portion of the food is directly roasted by conduction heat from the lower heating unit. Accordingly, since food does not need to be turned over frequently but can be roasted evenly without being burnt excessively, the improved bidirectional heating cooker according to the present invention is very suitable to roast meat such as pork or beef.

What is claimed is:

1. An improved bidirectional heating cooker comprising:
   an upper radiation unit that is located at the upper portion of the heating cooker and that comprises a heat radiator that emits radiation heat therein;
   a lower heating unit that is located at the lower portion of the heating cooker and that comprises a heater therein;
   a supporting pillar that connects the upper radiation unit with the lower heating unit;
   a coupling projection portion that is formed on the outer circumferential surface of the upper portion of the lower heating unit;
   a first pan portion having a first union groove that is fitted with the coupling projection portion of the lower heating unit and that is formed along the outer circumferential portion of the first pan portion, an incision portion that is formed in a cutout open form at one side of the first pan portion, and a first supporting projection portion that is formed in the incision portion and contacts an outer surface of the supporting pillar and is formed at the center of the inner portion of the first pan portion; and
   a second pan portion that is fitted in the incision portion of the first pan portion and having a second union groove that is formed at an outer-end portion of the second pan portion that is fitted with the coupling projection portion of the lower heating unit and that is formed at the lower portion of the second pan portion and a second supporting projection portion that is formed at an inner-end portion of the second pan portion that contacts an outer surface of the supporting pillar.

2. The improved bidirectional heating cooker according to claim 1, wherein oil discharge holes are formed on the first pan portion and the second pan portion so that oil is discharged through the oil discharge holes when flesh and meat are roasted.

3. The improved bidirectional heating cooker according to claim 1, wherein oil discharge holes are not formed on the first pan portion and the second pan portion so that oil is not discharged through the oil discharge holes during cooking a food with a soup such as a pot stew or beef casserole.

4. The improved bidirectional heating cooker according to claim 1, wherein oil discharge holes are formed on one of the first pan portion and the second pan portion so that oil is discharged through the oil discharge holes when flesh and meat are roasted, and oil discharge holes are not formed on the other one of the first pan portion and the second pan portion so that oil is not discharged through the oil discharge holes during cooking a food with a soup such as a pot stew or beef casserole.

* * * * *